(12) United States Patent
Yoo

(10) Patent No.: US 8,734,969 B2
(45) Date of Patent: May 27, 2014

(54) DUMMY CELL FOR BATTERY PACK AND MOLDING APPARATUS FOR MANUFACTURING BATTERY PACK

(75) Inventor: Daehyung Yoo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1378 days.

(21) Appl. No.: 12/235,787

(22) Filed: Sep. 23, 2008

(65) Prior Publication Data

US 2009/0092895 A1 Apr. 9, 2009

(30) Foreign Application Priority Data

Oct. 4, 2007 (KR) .................. 10-2007-0100040

(51) Int. Cl.
| | | |
|---|---|---|
| *H01M 2/00* | (2006.01) | |
| *H01M 2/02* | (2006.01) | |
| *B29C 45/00* | (2006.01) | |

(52) U.S. Cl.
CPC *H01M 2/02* (2013.01); *H01M 2/00* (2013.01); *B29C 45/00* (2013.01)
USPC .............................. 429/8; 425/542

(58) Field of Classification Search
CPC ........... H01M 2/00; H01M 2/02; B29C 45/00
USPC ................................... 429/8; 425/542
See application file for complete search history.

(56) References Cited

FOREIGN PATENT DOCUMENTS

| JP | 5-066868 A | 3/1993 | |
|---|---|---|---|
| JP | 8-185839 A | 7/1996 | |
| JP | 10-029172 A | 2/1998 | |
| JP | 2002-208388 A | 7/2002 | |
| JP | 2002208388 A | * 7/2002 | .............. H01M 2/10 |

\* cited by examiner

*Primary Examiner* — Joseph Kosack
(74) *Attorney, Agent, or Firm* — Knobbe, Martens, Olson & Bear, LLP

(57) ABSTRACT

A dummy cell for a battery pack and a mold for manufacturing the same, the dummy cell including: a pair of opposing circular plates; a pair of opposing lateral plates extending between the circular plates and connected to opposing edges of the circular plates; and a reinforcement unit extending between the circular plates and the lateral plates. The reinforcement unit can be T-shaped or cross-shaped. The mold includes upper and lower molds that have grooves to form the dummy cell.

21 Claims, 5 Drawing Sheets

DUMMY CELL FOR BATTERY PACK AND MOLDING APPARATUS FOR MANUFACTURING BATTERY PACK

CROSS-REFERENCE TO RELATED APPLICATION

This application claims the benefit of Korean Application No. 2007-100040, filed on Oct. 4, 2007, in the Korean Intellectual Property Office, the disclosure of which is incorporated herein by reference.

BACKGROUND OF THE INVENTION

1. Field of the Invention

Aspects of the present invention relate to a dummy cell for a battery pack and a mold for manufacturing the dummy cell.

2. Description of the Related Art

Unlike a primary battery a secondary battery is rechargeable. This has resulted in secondary batteries being used in a variety of electronic devices, such as mobile phones, PDAs, digital cameras, hybrid vehicles, and the like.

A secondary battery can be formed in various shapes, such as a cylindrical shape and a rectangular shape. A rectangular secondary battery is generally used for small electronic devices that require less power. A battery pack, in which a plurality of cylindrical secondary batteries are interconnected, is generally used in the devices requiring a lot of power.

As described above, a battery pack generally consists of a plurality of cylindrical secondary batteries, which are coupled in series (hereinafter, referred to as cylindrical cells). Each of the cylindrical cells includes a wound electrode assembly. The electrode assembly includes a positive electrode plate, a negative electrode plate, and a separator disposed therebetween. The electrode assembly is housed in a cylindrical can, and a cap assembly is used to seal an opening of the can.

A battery pack includes an exterior case to house the cylindrical cells. A mounting process is executed, in which a plurality of cylindrical cells are electrically coupled to the exterior case. Further, the cylindrical cells can be mounted in mounting spaces of the exterior case, and according to the circumstances, some of the mounting spaces may remain empty. When an exterior case includes empty mounting spaces, the cylindrical cells may move, due to the vacant mounting space. Thus, a dummy cell is used to fill the vacant mounting space.

FIG. 1 is a perspective view illustrating a conventional dummy cell 1000, and FIG. 2 is a perspective view illustrating a mold for manufacturing the dummy cell 1000. As illustrated in FIG. 1, the conventional dummy cell 1000 is a hollow cylinder. Such a dummy cell 1000 is manufactured in a mold that includes a slide core 1400, as illustrated in FIG. 2.

Referring to FIGS. 2-3, a conventional mold includes an upper mold 1100; a lower mold 1200; slide cores 1400 that move reciprocally in a width direction of the mold; and pushing pins 1500 that move through the lower mold 1200.

The upper mold 1100 includes an injection valve 1120 and semicircular cavities 1130 that correspond to semicircular cavities 1220 of the lower mold 1200. The upper and lower molds 1100, 1200 include core grooves 1110 and 1210 and resin supply channels 1140, 1230.

The processes for manufacturing a conventional cylindrical dummy cell by using the metal mold will now be explained. The upper and lower molds 1100, 1200 are brought into contact with each other, such that the semicircular cavities 1130, 1220 are coupled together to form cylindrical cavities 1300. The slide cores 1400 are inserted into the core grooves 1110, 1210, such that cylindrical cores 1410 of the slide cores 1400 are inserted into the cylindrical cavities 1300.

A resin is injected into the injection valve 1120 and then flows through the resin supply channels 1140, 1230 and into the cylindrical cavities 1300. The resin is then hardened to form the dummy cells 1000.

The upper and lower metal molds 1100, 1200 and the slide cores 1400 are then separated. The dummy cells 1000 are ejected from the lower metal mold 1200, using the pushing pins 1500.

However, since the conventional dummy cell 1000 is tube-shaped, the amount of resin required for manufacturing the dummy cell 1000 is relatively large, thereby increasing costs. In addition, because the slide cores 1400 must be inserted and removed, the manufacturing process requires more time than would be otherwise required if the slide cores 1400 were not needed.

SUMMARY OF THE INVENTION

Aspects of the present invention provide to a dummy cell for a battery pack, which can be produced using less resin than a conventional dummy cell.

Another aspect of the present invention is to provide a dummy cell for a battery pack, which can be molded in less time than a conventional dummy cell; and a mold that is used for manufacturing the dummy cell.

Aspects of the present invention provide a dummy cell for a battery pack, including: a pair of opposing circular plates; a pair of opposing lateral plates; and a reinforcement unit formed between the circular plates and the lateral plates, to support the circular plates and the lateral plates.

According to aspects of the present invention, the dummy cell can be formed as a unit, by injection molding, using a two piece mold.

According to aspects of the present invention, the reinforcement unit may include a first rib that is connected to the circular plates and the lateral plates, and a second rib that intersects the first rib and is connected to the circular plates 10. Ends of the first rib can extend between two opposing edges of each of the circular plates, and ends of the second rib can extend between two opposing edges of each of the circular plates.

According to aspects of the present invention, ends of the first rib can extend between two opposing edges of each of the circular plates, and ends of the second rib can extend from the centers of the circular plates to edges of the circular plates.

According to aspects of the present invention, the reinforcement unit can be cross-shaped, or T-shaped, in cross section.

According to aspects of the present invention, the dummy cell can further comprise an auxiliary circular plate that is disposed between the circular plates. The auxiliary circular plate and the circular plate can have the same diameters and can be aligned in parallel planes. The auxiliary circular plate can be disposed equidistantly from each of the circular plates.

According to aspects of the present invention, provided is a mold for manufacturing a dummy cell used in a battery pack. The mold includes a lower mold and an upper mold. The lower mold comprises: a pair of opposing first semicircular grooves; a pair of first arc grooves that are connected to opposing edges of each of the semicircular grooves, and which extend between the semicircular grooves; a first rib groove that extends between the semicircular grooves and the arc grooves; and a first resin injection line connected to the first semicircular grooves. The upper mold comprises: a pair of opposing second semicircular grooves; a pair of opposing second arc grooves that are connected to opposing edges of each of the second semicircular grooves, which extend between the second semicircular grooves, and between the arc grooves; a second rib groove that extends between the second semicircular grooves; and a second resin injection line connected to the second semicircular grooves, and comprising a resin injection valve.

According to aspects of the present invention, the first and second rib grooves can be T-shaped in cross section.

According to aspects of the present invention, the first rib groove can be T-shaped in cross section, and the second rib groove can be rectangular in cross section.

According to aspects of the present invention, the lower mold can further include a pair of pushing pins to eject a dummy cell.

According to aspects of the present invention, the lower mold can further comprise four pushing pins to eject a dummy cell.

According to aspects of the present invention, the lower mold further comprises a first auxiliary semicircular groove disposed between the first semicircular grooves; and the upper mold further comprises a second auxiliary semicircular groove disposed between the second semicircular grooves.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EXEMPLARY EMBODIMENTS

Figure 1:
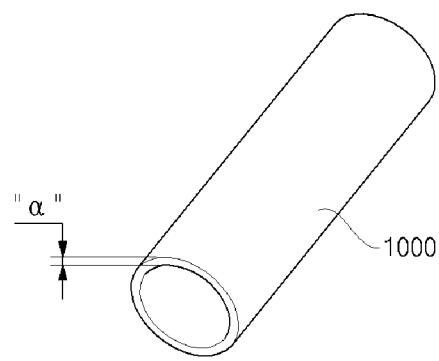
FIG. 1 is a perspective view illustrating a conventional dummy cell for a battery pack.
Figure 2:
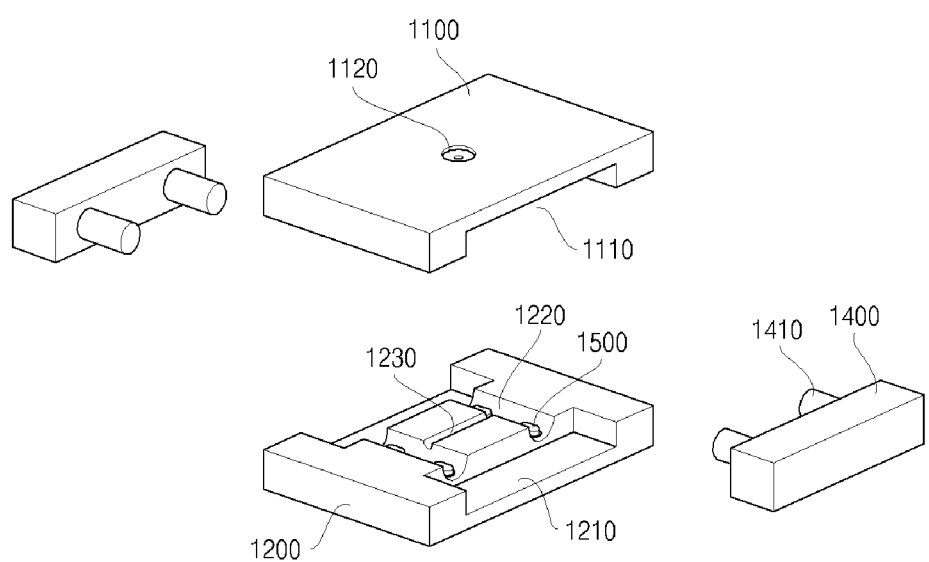
FIG. 2 an exploded perspective view illustrating a mold for manufacturing the conventional dummy cell of FIG. 1.
Figure 3:
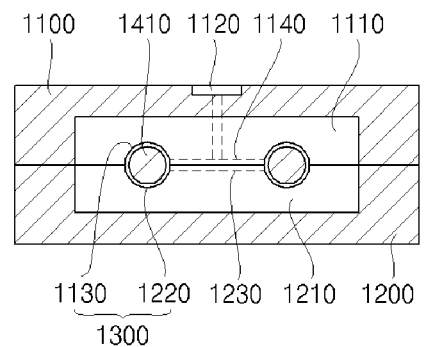
FIG. 3 is a cross-sectional view of a coupling state of the mold in FIG. 2.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 4:
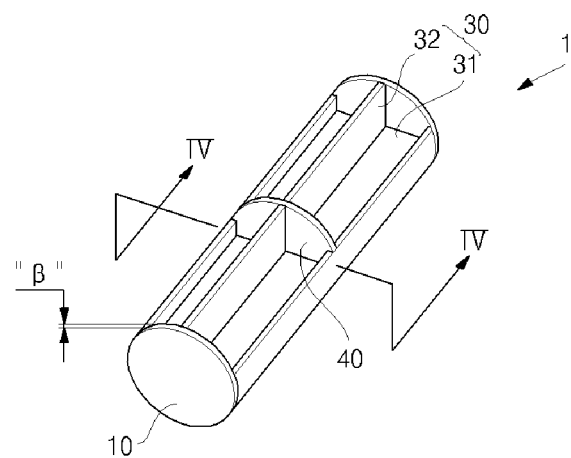
FIG. 4 is a perspective view illustrating a dummy cell for a battery pack, according to an exemplary embodiment of the present invention.
Figure 5:
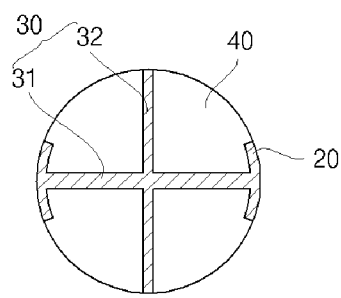
FIG. 5 is a cross-sectional view taken along line IV-IV of FIG. 4.
Figure 6:
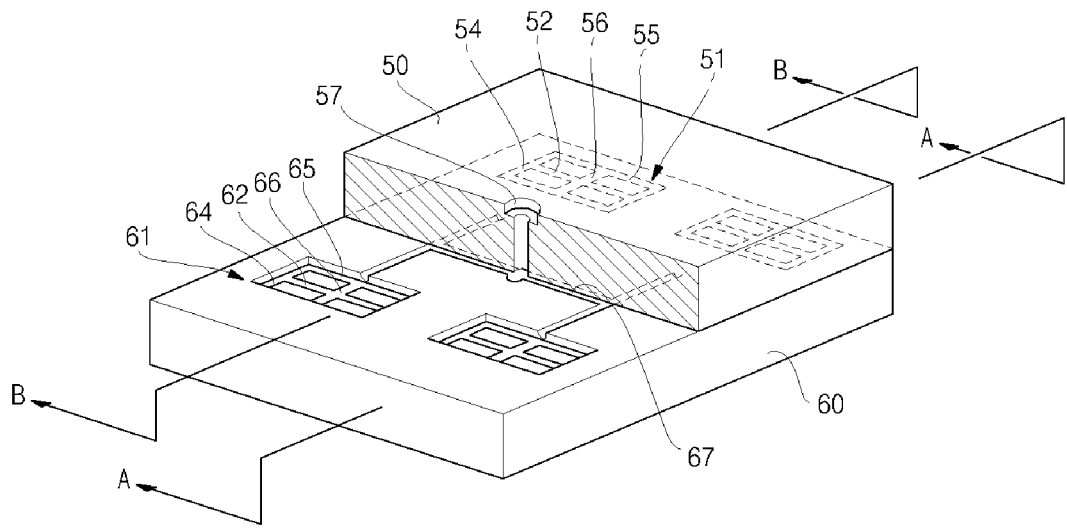
FIG. 6 is a partially cut perspective view illustrating a mold for manufacturing the dummy cell of FIG. 4.
Figure 7:
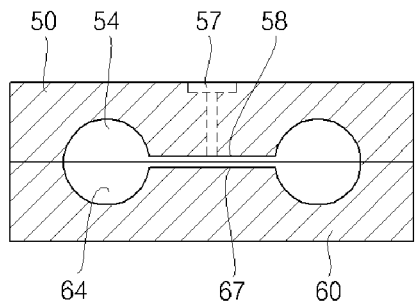
FIG. 7 is a cross-sectional view taken along line A-A of FIG. 6.
Figure 8:
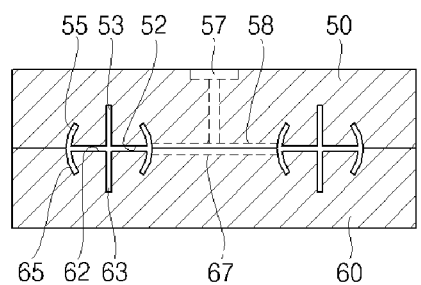
FIG. 8 is a cross-sectional view taken along line B-B of FIG. 6.
Figure 9:
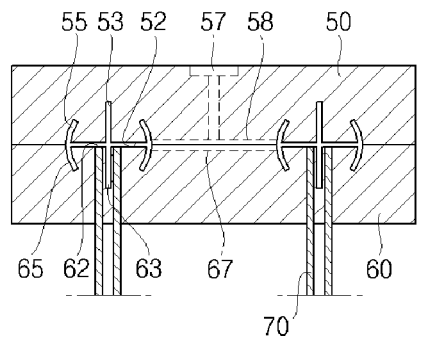
FIG. 9 is a cross-sectional view illustrating a mold, according to another exemplary embodiment of the present invention.

FIG. 4 is a perspective view illustrating a dummy cell 1 of a battery pack, according to an exemplary embodiment of the present invention, and FIG. 5 is a cross-sectional view taken along line IV-IV of FIG. 4. FIG. 6 is a partially cut perspective view illustrating a mold for manufacturing the dummy cell 1, and FIG. 7 is a cross-sectional view taken along line A-A of FIG. 6. FIG. 8 is a cross-sectional view taken along line B-B of FIG. 6.

As illustrated in FIGS. 4-7, the dummy cell 1 includes a pair of circular plates 10, a pair of lateral plates 20, and a reinforcement unit 30. The circular plates 10 face each, and the gap between the circular plates 10 corresponds to the length of a cylindrical cell. The gap between the circular plates 10 includes the thicknesses of the circular plates 10. Further, the areas of the circular plates 10 are equal to, or similar to, the size of a cross section of a cylindrical cell, that is, the circular plates 10 correspond in size to the ends of a cylindrical cell. Throughout the specification, the term "dummy cell" refers to a generally battery shaped core (formed of, for example, resin) which is designed to fit in a battery pack. A dummy cell is used to fill a vacant mounting space of a battery pack so that movement of the remaining battery cells is prevented or minimized.

The approximate size and volume of the dummy cell 1 are determined by the size of the circular plates 10 and the distance therebetween. The size of the dummy cell 1 can be varied, such that the dummy cell 1 can be used in different battery packs, by manufacturing the dummy cells 1 in various sizes.

The lateral plates 20 are arc-shaped and are disposed between the circular plates 10. The lateral plates 20 are arranged symmetrically around a long, central axis of the dummy cell 1. The lateral plates 20 form opposing lateral sides of the dummy cell 1. The lateral plates 20 can be connected to opposing edges of the circular plates, so as not to increase the width of the dummy cell 1.

The reinforcement unit 30 extends between the inner surfaces of the circular plates 10 and the inner surfaces of the lateral plates 20. The reinforcement unit 30 supports the circular plates 10 and the lateral plates 20. That is, the reinforcement unit 30 prevents the deformation of the dummy cell 1, due to external forces applied to the outer surfaces of the dummy cell 1.

The reinforcement unit 30 may include a first rib 31 and a second rib 32 that intersect one another, along the long axis of the dummy cell 1. In other words, the reinforcement unit 30 is cross-shaped in cross section. Ends of the first rib 31 support the inner sides of the circular plates 10, and sides of the first rib 31 support the lateral plates 20. Ends of the second rib 32 support the inner sides of the circular plates 10. The structure of the reinforcement unit 30 spreads out forces applied to the dummy cell 1.

Generally, the reinforcement unit 30 is formed such that a cross-section thereof, is no larger than the circular plates 10.

That is, the first rib 31 and the second rib 32 do not extend past the edges of the circular plates 10. This structure allows the dummy cell 1 to be smoothly mounted in a cell of a battery pack.

The dummy cell 1 may further include an auxiliary circular plate 40 that is disposed between, and facing, the circular plates 10. The auxiliary circular plate 40 is generally no larger than the circular plates 10. The auxiliary circular plate 40 supports the reinforcement unit 30 and the lateral plates 20. The auxiliary circular plate 40 and the circular plates 10 can be aligned in parallel planes.

Since the auxiliary circular plate 40 and the circular plates 10 are generally the same size, when the dummy cell 1 is mounted in a battery pack, the circular plates 10 and the auxiliary circular plate 40 contact the mounting space of the battery pack. This structure facilitates mounting and stability.

The auxiliary circular plate 40 is generally disposed at an equal distance from both of the circular plates 10. Therefore, the auxiliary circular plate 40 can further equalize pressure applied to the dummy cell 1.

Generally, is preferable that the circular plates 10, the lateral plates 20, and the reinforcement unit 30 are formed simultaneously, by injection molding. However, such a process is generally considered to be difficult, in view of the size of the dummy cell 1. Therefore, the dummy cell 1 is manufactured by using a mold having two parts.

FIGS. 6 to 8 illustrate a mold 600 for manufacturing the dummy cell 1. As illustrated in the drawings, the mold 600 includes an upper mold 50 having first cavities 51, and a lower mold 60 having second cavities 61. The first and second cavities 51, 61 are symmetrical to each other, and each form approximately half of a dummy cell 1. The upper and lower molds 50, 60 can be formed of a metal, a ceramic material, or any other suitable material.

The second cavities 61 each include: a pair of semicircular grooves 64; a pair of arc grooves 65 that extend between the semicircular grooves 64; and rib grooves 62, 63 that form a T-shaped intersection and extend between the semicircular grooves 64 and the arc grooves 65. The lower mold also includes a first resin injection line 67 that is coupled to the second cavities 61.

Each of the first cavities 51 includes: a pair of semicircular grooves 54; a pair of arc grooves 65 that extend between the semicircular grooves 54; and rib grooves 52, 53 that form a T-shaped intersection and extend between the semicircular grooves 54 and the arc grooves 65. The upper mold 50 also includes a second resin injection line 58 that is connected to the first cavity 51, and a resin injection valve 57 that is connected to the second resin injection line 58.

The upper and lower molds 50 and 60 also include auxiliary semicircular grooves 56 and 66. The auxiliary semicircular grooves 56 can be formed equidistantly between the semicircular grooves 54, and the auxiliary semicircular grooves 66 can be formed equidistantly between the semicircular grooves 64.

The upper and lower molds 50, 60 are coupled together, such that the various cavities match up, so as to form a blank for the dummy cell 1. A resin is injected into the resin injection valve 57, and the resin flows along the first and second resin supply lines 67, 58 and is injected into the first and second cavities 51, 61. The resin is hardened to form a dummy cell 1, as illustrated in FIG. 4. If the auxiliary semicircular grooves 56, 66 are not formed, the dummy cell 1 does not include the auxiliary circular plate 40.

The lower mold 60 may include pushing pins 70, which are used to eject the completed dummy cells 1 from the mold 600. That is, after the dummy cells 1 are completed, the upper and lower molds 50, 60 are separated, and the pushing pins 70 are extended into the lower mold 60, thereby ejecting the completed dummy cells 1. The pushing pins 70 are disposed at a first position, where the ends thereof are flush with the rib grooves 62, 63. The pushing pins 70 can be moved to a second position, where the ends thereof protrude into the lower mold 60, to eject the dummy cell 1.

The pushing pins 70 are formed symmetrically on both sides of the auxiliary semicircular grooves 66, so as to apply the same force on both sides of the reinforcement unit 30. According to some embodiments, four pushing pins 70 can be arranged symmetrically around the auxiliary semicircular grooves 66. When the auxiliary semicircular grooves 66 are not included, the pushing pins 70 can be arranged symmetrically around the rib grooves 62.

As illustrated above, a dummy cell 1 can be manufactured using the mold 600, with a significantly reduced amount of resin, as compared to the conventional dummy cell 1000. In addition, the manufacturing time and cost is also reduced, as compared to the conventional dummy cell 1000. That is, as the conventional dummy cell 1000 is a tube, it must have a relatively larger thickness, so as not to be deformed during hardening of the resin. Therefore, the conventional dummy cell 1000 requires much more resin during manufacturing. Since the conventional dummy cell 1000 is manufactured using a slide core, the manufacturing time thereof is increased, due to the operation of the slide core.

On the contrary, the dummy cell 1 of the present invention has a discontinuous exterior surface that is formed by the circular plates 10 and the arc plates 20. Since the area of the outer surface is less than that of the conventional dummy cell 1000, the probability of molding distortions is also reduced. In addition, the circular plates 10 and the arc plates 20 are supported by the reinforcement unit 30, which allows for the thickness of the circular plates 10 and the arc plates 20 to be reduced.

Thicknesses $\alpha$ and B, of FIGS. 1 and 4, illustrate the differences in the thickness of the dummy cell 1 and the conventional dummy cell 1000. For example, the dummy cell 1 may have a resin volume of 3257.2 mm^3. In order to produce the conventional dummy cell 1000 of the same size and strength, a resin volume of 4053.4 mm^3 would be required.

Since the ends of the dummy cell 1 are enclosed by the circular plates 10, the dummy cell 1 can be manufactured using the upper and lower molds 50, 60, thereby reducing the manufacturing time, as compared to the conventional dummy cell 1000. That is, the dummy cell 1 can be manufactured without using slide cores, on account of these structural characteristics. Consequently, the upper and lower molds 50, 60 need only to be brought together and separated, without waiting for the application of slide cores. Therefore, the manufacturing time is comparatively reduced.

Figure 10:
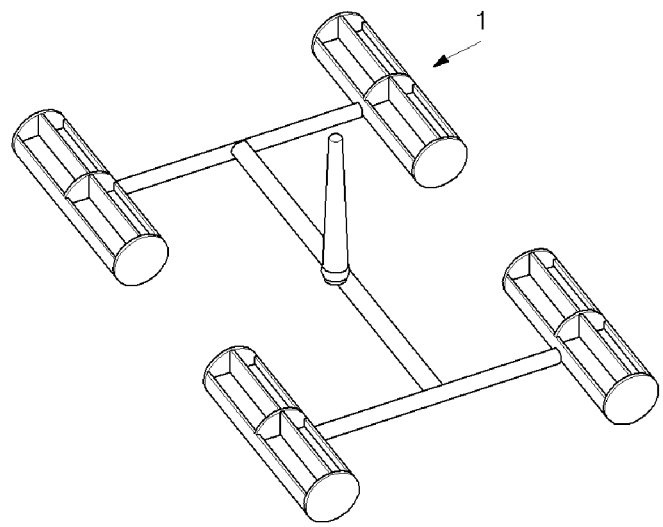
FIG. 10 is a perspective view a dummy cell manufactured using the molds of FIG. 6 to FIG. 9.

FIG. 10 illustrates a plurality of dummy cells 1, before the dummy cells are removed from the mold 600. In FIG. 6-FIG. 9, the upper and lower molds 50, 60 each have four cavities. However, the present invention is not limited thereto.

Figure 11:
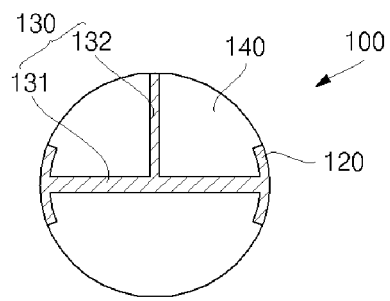
FIG. 11 is a cross-sectional view illustrating a dummy cell, according to another exemplary embodiment the present invention.

FIG. 11 is a view illustrating a dummy cell 100, according to another exemplary embodiment of the present invention. As illustrated in the FIG. 11, the dummy cell 100 includes a reinforcement unit 300 including circular plates (not shown), lateral plates 120, a first rib 301, and a second rib 302. The first rib 310 extends between the circular plates and the lateral plates 120. The second rib 302 forms a T-shaped intersection with the first rib 301 and extends between the circular plates. In other words, the second rib 302 differs from the second rib 102, in that the second rib 302 only extends from one side of the first rib 301. As a result, it is possible to reduce the amount of the resin forming the dummy cell 100, although the dummy cell 100 may not be as strong as the dummy cell 1.

Figure 12:
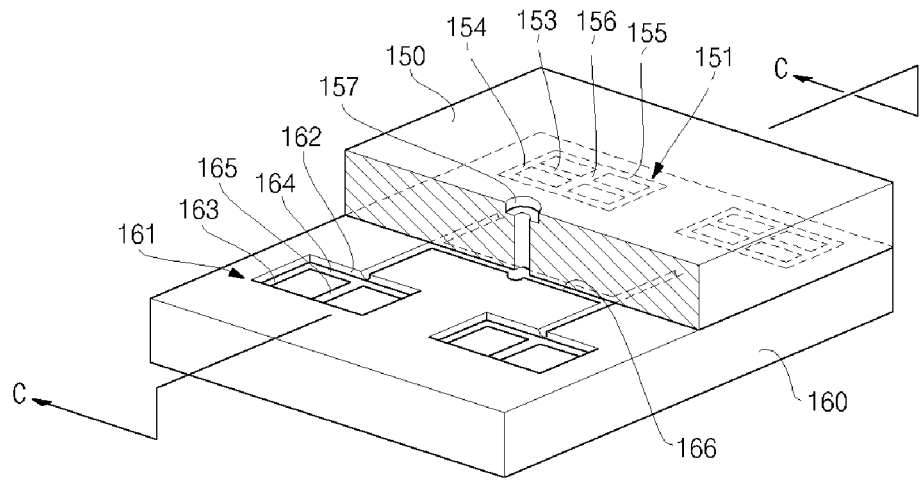
FIG. 12 is a partially cut perspective view illustrating a mold for manufacturing the dummy cell of FIG. 11.
Figure 13:
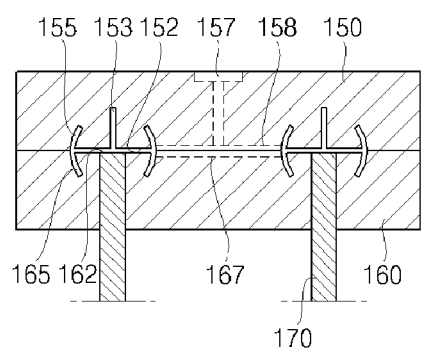
FIG. 13 is a cross-sectional view taken along line C-C of FIG. 12.

FIGS. 12 and 13 illustrate a mold 700 for manufacturing the dummy cell 100. The mold 700 includes an upper mold 50 and a lower mold 161. The mold 700 has a similar structure to the mold 600, except the lower mold 160 does not include the rib grooves 62 of the lower mold 60. Therefore, only the differences between the molds 600, 700 will be mainly described, i.e., the differences between the lower molds 60 and 160, as the same upper mold 50 is used in both embodiments.

The lower mold 160 includes first cavities 161. The first cavities 161 include: a pair of semicircular grooves 163; a pair of arc grooves 164 that extend between the semicircular grooves 163; a first rib groove 162 that extends between the semicircular grooves 163 and the arc grooves; and a first supply line 167. Since the lower mold 160 does not include a second rib groove, the structure thereof is simplified, as compared to the lower mold 60. The lower mold 160 may optionally include an auxiliary semicircular groove 165, which is disposed between the semicircular grooves 163.

Since the second rib 302 does not extend through the first rib 301, pushing pins 170 of the lower mold 160 can be positioned so as to contact the midline of the first rib 301. In addition, the pushing pins 170 can be enlarged, as compared to the pushing pins 70. While a pair of the pushing pins 170 are shown, the present invention is not limited to any particular number of the pushing pins 170

According to aspects of the present invention, a dummy cell for a battery pack and a mold for manufacturing the dummy cell are provided. The dummy cell is made using a smaller amount of resin than a conventional dummy cell. In addition, the mold has a simplified structure, resulting in additional cost and processing time benefits.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A non-conductive dummy cell of a battery pack, comprising:
    a pair of opposing circular plates forming ends of the dummy cell;
    a pair of opposing lateral plates that connect the circular plates and extend between opposing edges of the circular plates; and
    a reinforcement unit that extends between the circular plates and supports the circular plates and the lateral plates.

2. The non-conductive dummy cell of claim 1, wherein the dummy cell is formed as a unit, by injection molding.

3. The non-conductive dummy cell of claim 2, wherein the dummy cell is formed in a two piece mold.

4. The non-conductive dummy cell of claim 3, wherein each piece of the mold forms about half of the dummy cell.

5. The non-conductive dummy cell of claim 1, wherein the reinforcement unit is cross-shaped and comprises:
    a first rib that is connected to the circular plates and the lateral plates; and
    a second rib that extends orthogonally through the first rib and is connected to the circular plates.

6. The non-conductive dummy cell of claim 5, wherein ends of the first and second ribs each extend between two opposing edges of each of the circular plates.

7. The non-conductive dummy cell of in claim 1, wherein the reinforcement unit is T-shaped and comprises:
    a first rib that is connected to the circular plates and the lateral plates; and
    a second rib the is connected to the circular plates, and which extends orthogonally from one side of the first rib.

8. The non-conductive dummy cell of claim 7, wherein:
    ends of the first rib extend between two opposing edges of each of the circular plates; and
    ends of the second rib extend from the centers of the circular plates, to an edge of the circular plates.

9. The non-conductive dummy cell of claim 1, further comprising an auxiliary circular plate disposed between the circular plates.

10. The non-conductive dummy cell of claim 9, wherein the auxiliary circular plate is disposed equidistantly from each of the circular plates.

11. A mold to manufacture a dummy cell of a battery pack, comprising:
    a lower mold comprising,
        a pair of opposing first semicircular grooves,
        a pair of first arc grooves connecting opposing edges of each of the first semicircular grooves, and which extend between the first semicircular grooves,
        a first rib groove connecting the first semicircular grooves and extending along the first arc grooves, and
        a first resin injection line extending to the first arc grooves; and
    an upper mold comprising,
        a pair of opposing second semicircular grooves,
        a pair of opposing second arc grooves connecting opposing edges of each of the second semicircular grooves and extending along the second arc grooves
        a second rib groove connecting the second semicircular grooves and extending along the second arc grooves, and
        a second resin injection line extending to the second arc grooves and comprising a resin injection valve.

12. The mold of claim 11, wherein the first and second rib grooves are T-shaped.

13. The mold of claim 11, wherein:
    the first rib groove is rectangular in cross section; and
    the second rib groove is T-shaped in cross section.

14. The mold of claim 13, wherein the lower mold further comprises a pair of pushing pins to eject the dummy cell.

15. The mold of claim 12, wherein when the upper and lower molds are joined together, the first and second rib grooves form a channel that is cross-shaped in cross section.

16. The mold of claim 13, wherein the lower mold further comprises four pushing pins to eject the dummy cell.

17. The mold of claim 10, wherein:
    the lower mold further comprises a first auxiliary semicircular groove disposed between the first semicircular grooves; and
    the upper mold further comprises a second auxiliary semicircular groove disposed between the second semicircular grooves.

18. The mold of claim 17, wherein the first and second auxiliary semicircular grooves are respectively disposed equidistantly from each of the first and second semicircular grooves.

19. The non-conductive dummy cell of claim 1, wherein the lateral plates are curved to match the circumferences of the circular plates.

20. The non-conductive dummy cell of claim 9, wherein the circular plates and the auxiliary circular plate each have the same radius and are aligned in parallel planes.

21. The non-conductive dummy cell of claim 1, wherein the non-conductive dummy cell is configured to fill a vacant mounting space in a battery pack.

\* \* \* \* \*